(12) United States Patent
Curran

(10) Patent No.: US 10,650,657 B1
(45) Date of Patent: May 12, 2020

(54) SMART WEARABLE ACCESSORY AS A RESCUE AND TRACKING DEVICE

(71) Applicant: Nancy Curran, Elk Grove Village, IL (US)

(72) Inventor: Nancy Curran, Elk Grove Village, IL (US)

( * ) Notice: Subject to any disclaimer, the term of this patent is extended or adjusted under 35 U.S.C. 154(b) by 0 days.

(21) Appl. No.: 16/280,129

(22) Filed: Feb. 20, 2019

(51) Int. Cl.
*G08B 21/02* (2006.01)
*G08B 21/04* (2006.01)
*G08B 21/18* (2006.01)
*G08B 27/00* (2006.01)
*H04W 4/029* (2018.01)
*G08B 5/38* (2006.01)
*G08B 3/10* (2006.01)

(52) U.S. Cl.
CPC ............ *G08B 21/043* (2013.01); *G08B 3/10* (2013.01); *G08B 5/38* (2013.01); *G08B 21/0269* (2013.01); *G08B 21/0446* (2013.01); *G08B 21/182* (2013.01); *G08B 27/006* (2013.01); *H04W 4/029* (2018.02)

(58) Field of Classification Search
CPC ............ G08B 25/016; G08B 21/0202; G08B 21/0216; G08B 21/0269; G08B 21/0288; G08B 21/043; G08B 21/182; A61B 5/0022; A61B 5/1112; A61B 5/1113; A61B 5/681; A61B 5/6813; A61B 5/6822
See application file for complete search history.

(56) References Cited

U.S. PATENT DOCUMENTS

| | | | |
|---|---|---|---|
| 5,243,329 A * | 9/1993 | Happer, Jr. ............ | G08B 17/10 340/628 |
| 8,768,294 B2 | 7/2014 | Reitnour et al. | |
| 9,646,476 B1 * | 5/2017 | Hansen ................. | G08B 21/14 |
| 9,747,770 B1 * | 8/2017 | Bartlett .............. | G08B 21/0269 |
| 2007/0241261 A1 * | 10/2007 | Wendt .................... | G01D 9/005 250/221 |
| 2008/0062120 A1 * | 3/2008 | Wheeler .............. | G08B 25/016 345/156 |
| 2009/0322513 A1 * | 12/2009 | Hwang .............. | A61B 5/02055 340/539.12 |
| 2010/0267361 A1 * | 10/2010 | Sullivan .................. | G01S 19/17 455/404.2 |
| 2013/0113621 A1 * | 5/2013 | So ........................ | A01K 11/008 340/539.13 |

(Continued)

*Primary Examiner* — Andrew W Bee
(74) *Attorney, Agent, or Firm* — Sanchelima & Associates, P.A.; Christian Sanchelima; Jesus Sanchelima

(57) ABSTRACT

The present invention is disclosing a smart wearable accessory for rescue and tracking, comprising a belt portion configured to be worn by a wearer using a fastening mechanism. Belt portion comprises one or more sensors configured to generate signals corresponding to detection of one or more events in a facility, a global positioning system (GPS) tracker configured to detect a location of a wearer in facility, and a microprocessor. Microprocessor is configured to determine a severity level of one or more events based on an analysis of generated signals and location of wearer in facility, and generate one or more notifications and/or alert signals for one or more devices, communicably coupled to smart wearable accessory, based on determined severity level of one or more events. Microprocessor further activates a set of output devices positioned on belt portion based on signals received from one or more sensors.

17 Claims, 3 Drawing Sheets

(56) References Cited

U.S. PATENT DOCUMENTS

| | | | |
|---|---|---|---|
| 2015/0094544 A1* | 4/2015 | Spolin | A61B 5/7275 |
| | | | 600/301 |
| 2016/0035205 A1* | 2/2016 | Messenger | A61B 5/746 |
| | | | 340/539.15 |
| 2016/0324487 A1* | 11/2016 | Guo | G08B 21/0269 |
| 2017/0030720 A1* | 2/2017 | Moore | G01C 21/206 |
| 2017/0083018 A1* | 3/2017 | Womble | A01K 27/009 |
| 2017/0162034 A1* | 6/2017 | Murawski | G08B 25/016 |
| 2017/0229004 A1* | 8/2017 | Shah | F41H 9/10 |
| 2017/0251962 A1* | 9/2017 | Shiho | A61B 5/0004 |
| 2018/0028106 A1* | 2/2018 | Leschinsky | A61B 5/411 |
| 2018/0042513 A1* | 2/2018 | Connor | A61B 5/7285 |
| 2018/0110465 A1* | 4/2018 | Naima | A61B 5/0006 |
| 2018/0279965 A1* | 10/2018 | Pandit | A61B 5/6826 |
| 2019/0012895 A1* | 1/2019 | Myers | A61B 5/0022 |
| 2019/0033043 A1* | 1/2019 | Piccioni | G01L 5/0052 |

* cited by examiner

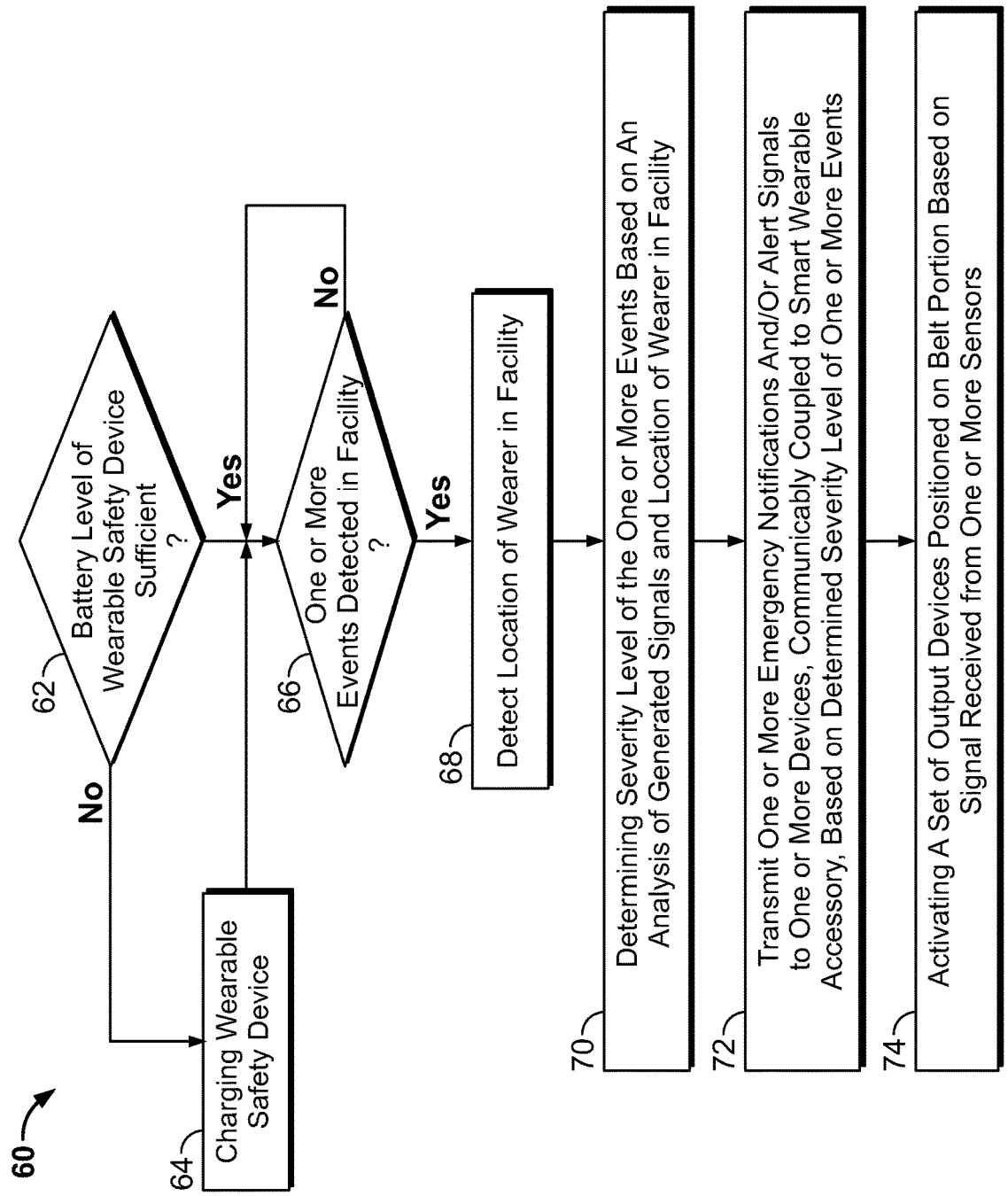

SMART WEARABLE ACCESSORY AS A RESCUE AND TRACKING DEVICE

BACKGROUND OF THE INVENTION

1. Field of the Invention

The present disclosure relates to a smart wearable accessory. More particularly, the present disclosure relates to a smart wearable accessory that may be used as a rescue and tracking device.

2. Description of the Related Art

Many smart devices are widely used all over for tracking and monitoring purposes. Such smart apparatuses are of a great assistance to parents, guardians, and medical supervisors for tracking and monitoring wearer of smart wearable accessory, and be assured of their health and safety.

Several designs of smart devices have been presented in the past. None of them, however, presents a simple and smart wearable accessory that is user friendly, simple to use, and a great rescue and tracking device when wearer of smart wearable accessory encounters an unfortunate incident.

Applicant believes that a related reference corresponds to U.S. Pat. No. 8,768,294B2 by Philip A. Reitnour et al. that discloses a server for tracking and providing emergency notifications for a plurality of mobile devices. Virtual boundaries of a geographic area to be monitored are defined. Server receives a communication from one of said plurality of mobile devices indicating a user of that mobile device is involved in an emergency situation. Server determines from GPS coordinates and a defined boundary of geographic area to be monitored that mobile device from which communication was received is located in that geographic area. Server then displays location of mobile device on an image of geographic area being monitored. However, such tracking requires a well-established infrastructure and may be very costly for a user.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide a smart wearable accessory, comprising a belt portion configured to be worn by a wearer using a fastening mechanism. Belt portion comprises one or more sensors configured to generate signals corresponding to detection of one or more events in a facility. Belt portion further comprises a global positioning system (GPS) tracker configured to detect a location of a wearer in facility. Belt portion further comprises a microprocessor configured to determine a severity level of one or more events based on an analysis of generated signals and location of wearer in facility, transmit one or more emergency notifications and/or alert signals to one or more devices, communicably coupled to smart wearable accessory, based on determined severity level of one or more events, and activate a set of output devices positioned on belt portion based on signals received from one or more sensors.

In an embodiment, wearer is a human and wears smart wearable accessory as a waist band, an arm band, a wrist band, or an ankle band. In another embodiment, wearer is a pet associated with a user and wears smart wearable accessory as a collar band.

In various embodiments, one or more devices correspond to a mobile device of a user associated with wearer, a first communication device associated with a sensor system installed in facility, a second communication device associated with a police team, a third communication device associated with an emergency rescue team, and a fourth communication device associated with a medical team. Smart wearable accessory is pre-registered with one or more devices. One or more devices are communicatively coupled with smart wearable accessory via a communication network. Communication network is one of a long distance communication network or a short distance communication network.

In an embodiment, a deactivation button may be configured to be manipulated to deactivate activated set of output devices. Set of output devices may comprise a plurality of LED lights configured to generate light flashes, and a speaker system configured to generate audio beeps or voice messages. In an embodiment, GPS tracker in smart wearable accessory is synchronized with a GPS navigation application installed in a mobile device of a user associated with wearer.

In various embodiments, fastening mechanism is realized by use of a buckle, a Velcro or a snap and fit mechanism. Belt portion may further comprise rechargeable battery configured to supply power to one or more sensors, GPS tracker, microprocessor, and set of output devices.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 3 is a flowchart for illustrating a method implemented by smart wearable accessory 12, according to an embodiment described herein.

DETAILED DESCRIPTION OF THE EMBODIMENTS OF THE INVENTION

Figure 1:
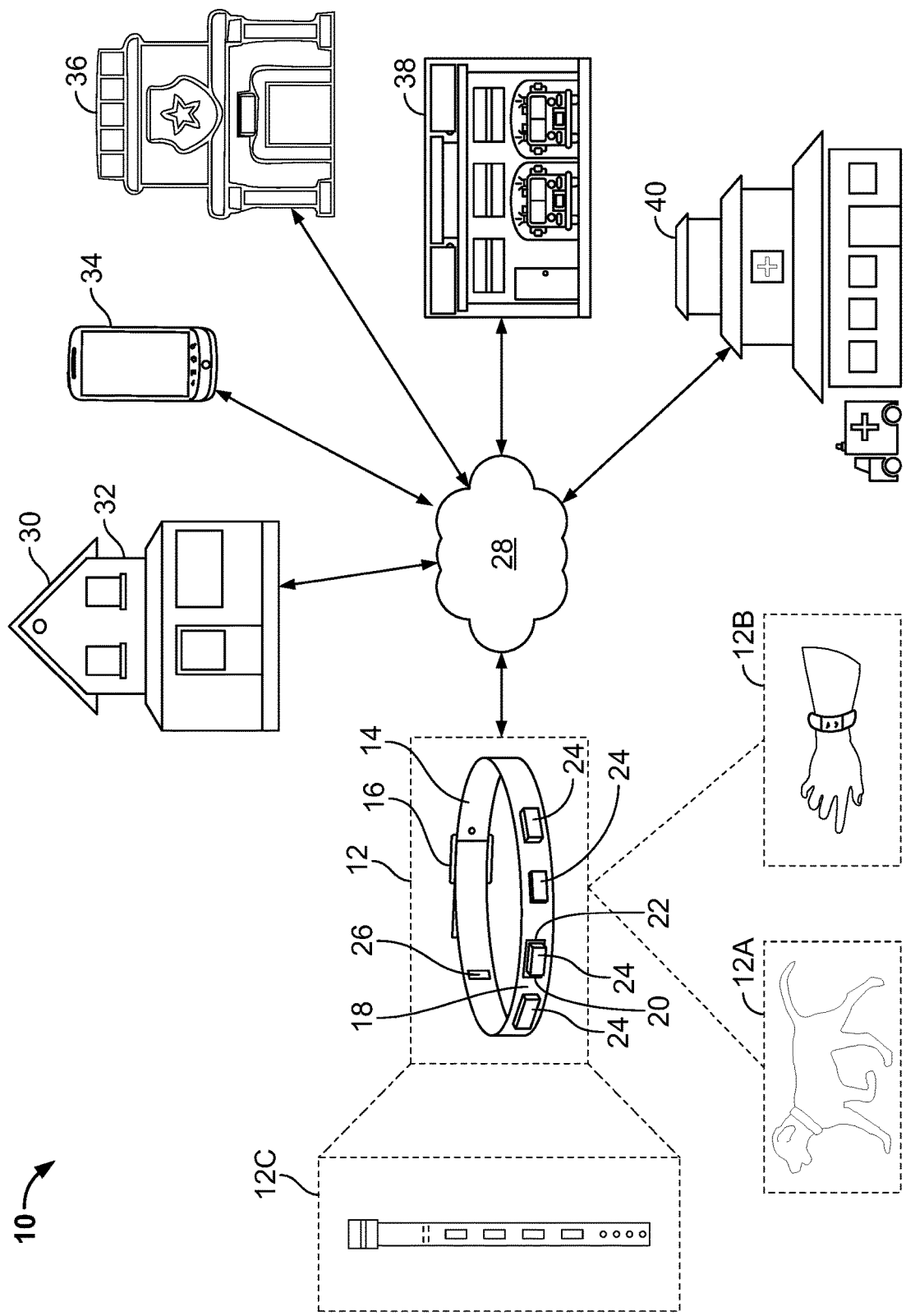
FIG. 1 represents a smart wearable accessory 12 of present invention in its operating environment 10, according to an embodiment described herein.

Referring now to the drawings, FIGS. 1-3, where the present invention is generally referred to with numeral 12, it can be observed that a smart wearable accessory, in accordance with one embodiment, is provided that includes various components, a described hereinafter.

FIG. 1 illustrates smart wearable accessory 12 of the present invention in its operating environment 10, according to an embodiment described herein. Smart wearable accessory 12 may include a belt portion 14 and a fastening mechanism 16, such as buckle. Fastening mechanism 16 may be further realized by use of a Velcro or a snap and fit mechanism. Further, belt portion 14 may comprise a one or more sensors 20 (such as a smoke sensor), a speaker system 22 that generates an alarm, and a plurality of LED lights 24. Belt portion 14 may comprise rechargeable battery 26 and a microprocessor 18 (not shown at outer but inner surface of belt portion 14.

FIG. 12A illustrates an embodiment when wearer of smart wearable accessory 12 is a pet owned by a user. In such case, wearer of smart wearable accessory 12 may wear smart wearable accessory 12 as a collar band. Further, FIG. 12B illustrates another embodiment when wearer of smart wearable accessory 12 is a human, for example a child, an elderly person, or an infirm family member related to user. User may have a mobile device 34 communicably coupled and synched with smart wearable accessory 12 via communication network 28. In such case, wearer of smart wearable accessory 12 wears smart wearable accessory 12 as a waist band, an arm band, a wrist band, or an ankle band. Further, FIG. 12C illustrates smart wearable accessory 12 in state when not wont, or wearer of smart wearable accessory 12 may be a human and Smart wearable accessory 12 may be communicably coupled to one or more devices, such as one or more devices 42 (described in FIG. 2) via communication network 28. One or more devices 42 may include a mobile device 34 of a user related to wearer, a first communication device associated with sensor system 30 installed in facility 32, a second communication device associated with police team 36, a third communication device associated with emergency rescue team 38, and a fourth communication device associated with medical team 40.

In operation, one or more sensors 20 (such as a smoke sensor) may be configured to generate signals corresponding to detection of one or more events in facility 32, for example a fire accident occurred at home. In an embodiment, sensor system 30, installed in facility 32, may be configured to generate signals corresponding to fire accident in facility 32. A GPS tracker (not shown in FIG. 1) may be configured to detect location of wearer of smart wearable accessory 12 in facility 32. Based on an analysis of generated signals and location of smart wearable accessory 12 in facility 32, microprocessor 18 may determine severity level of fire accident. Microprocessor 18 may generate one or more emergency notifications and/or alert signals based on determined severity level. Microprocessor 18 may further transmit such generated one or more emergency notifications and/or alert signals to one or more devices 42. Examples of one or more devices may include mobile device 34 of a user associated with wearer, first communication device associated with sensor system 30 installed in facility 32, second communication device associated with police team 36, third communication device associated with emergency rescue team 38, and fourth communication device associated with medical team 40. Microprocessor 18 may further activate speaker system 22 that generates an alarm, and plurality of LED lights 24 positioned on belt portion 14. GPS tracker may also display current location of wearer on display screen of mobile device 34 of user. Accordingly, user, and personnel from police team 36, emergency rescue team 38, and medical team 40 may be able to locate and track wearer in or around facility 32 easily.

Figure 2:
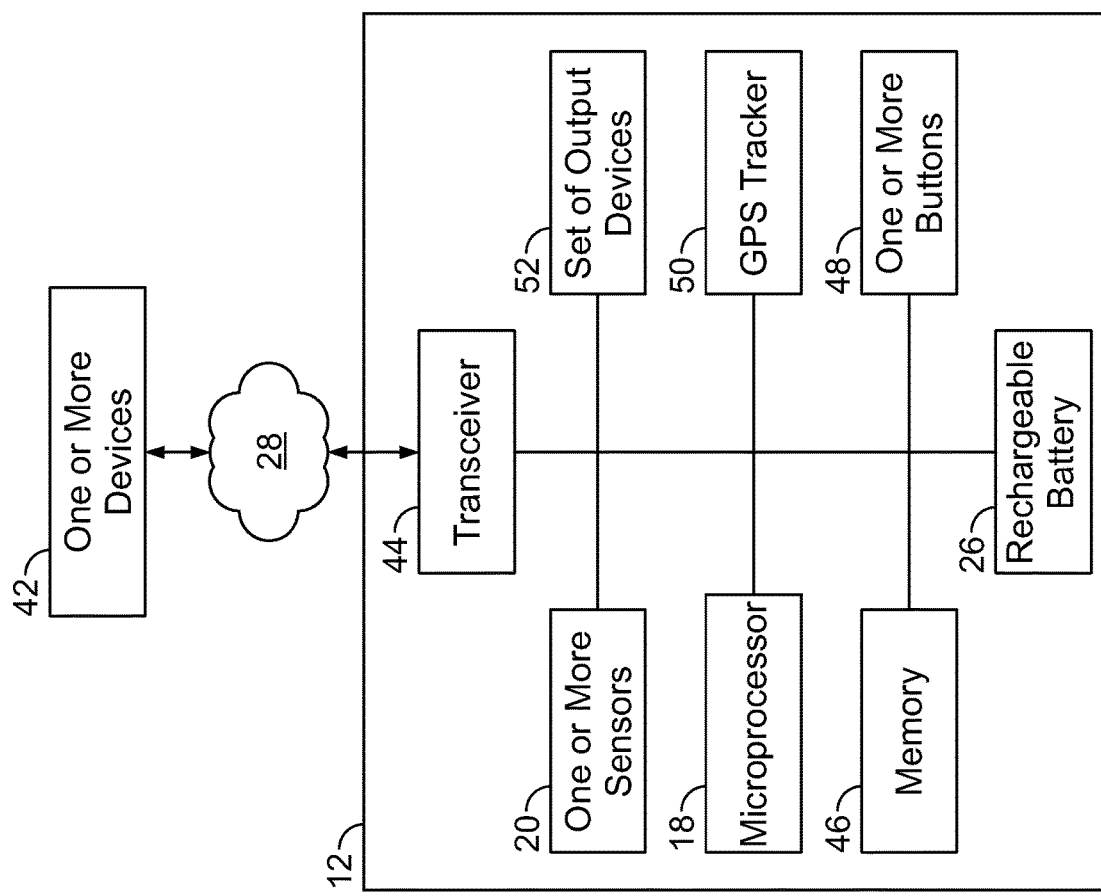
FIG. 2 demonstrates a block diagram of smart wearable accessory 12, according to various embodiments described herein.

FIG. 2 demonstrates a block diagram of smart wearable accessory 12, according to various embodiments described herein. Smart wearable accessory 12 may include microprocessor 18, one or more sensors 20, rechargeable battery 26, transceiver 44, memory 46, one or more buttons 48, GPS tracker 50, and set of output devices 52.

Microprocessor 18 may be configured to perform analysis of generated signals, determine severity level of one or more events, generate one or more emergency notifications and/or alert signals, and activate plurality of electronic units, such as set of output devices 52 that render one or more emergency notifications and/or alert signals. Microprocessor 18 may be an X86-based processor, a Reduced Instruction Set Computing (RISC) processor, an Application-Specific Integrated Circuit (ASIC) processor, a Complex Instruction Set Computing (CISC) processor, a microcontroller, a central processing unit (CPU), a digital signal processor (DSP), a graphics processor unit (GPU), a coprocessor, and/or other processors or integrated circuits.

One or more sensors 20, such as smoke sensor, contact sensor, proximity sensor, motion sensor, biometric sensor, or pressure sensor, may be configured to detect an event occurring in vicinity of wearer of smart wearable accessory 12 and generate a signal. Event may correspond to an emergency event, such as fire, earth quake, or other such natural calamity. Generated signal may cause microprocessor 18 to activate, for example, at least set of output devices 52, based on detected event.

Rechargeable battery 26 may be configured to provide power to plurality of electronic and electrical components, such as one or more sensors 20, GPS tracker 50, microprocessor 18, and set of output devices 52, of smart wearable accessory 12. In an embodiment, rechargeable battery 26 may be charged from an external power supply via a power cable (not shown). In an embodiment, rechargeable battery 26 may be lithium-ion batteries that are small, durable, and having long life. Alternatively, rechargeable battery 26 may be recharged when power level drops below a threshold power level.

Transceiver 44 may correspond to a communication means in smart wearable accessory 12 through which smart wearable accessory 12 may be configured to communicate with one or more devices 42 via communication network 28. Communication network 28 may be a short distance network or a long distance network. In an embodiment, smart wearable accessory 12 may be pre-registered with one or more devices 42.

Memory 46 may be configured to temporarily store various data, such as rendering pattern of audio beeps and plurality of pre-recorded voice messages that may be retrieved by microprocessor 18 based on a selection provided by a user via one or more buttons 48, as illustrated in FIG. 1.

One or more buttons 48 may comprise a set of hardware or software buttons that may be manipulated by user to perform various operations, such as power on, power off, or selection of rendering pattern of audio beeps, flashing pattern of lights, and playout of plurality of pre-recorded voice messages. One or more buttons 48 may comprise a deactivation button configured to be manipulated to deactivate activated set of output devices 52.

GPS tracker 50 may be a navigation device, which may use global positioning system to track movements of wearer and indicate exact location of wearer of smart wearable accessory 12. GPS tracker 50 may receive location information from a location sensor of smart wearable accessory 12, and such location information may be displayed against a map backdrop in real time, using GPS tracking software installed at mobile device 34 of user. In an embodiment, GPS tracker 50 in smart wearable accessory 12 may be synchronized with a GPS navigation application installed in mobile device 34 of a user related to wearer.

Set of output devices 52 may be devices that may be configured to generate feedback signals to alert associated user about one or more events described in FIG. 1. For example, set of output devices 52 may include a speaker system 22 that may render audio beeps or voice messages upon activation by microprocessor 18. In another example, set of output devices 52 may include a plurality of LED lights 24 that may flash upon activation by microprocessor 18. Rendering pattern of audio beeps, plurality of pre-recorded voice messages, and flashing pattern of plurality of LED lights 24 may be retrieved by microprocessor 18 from memory 46 based on a selection provided by user via one or more buttons 48.

FIG. 3 is a flowchart 60 for illustrating a wearable-device monitoring method by smart wearable accessory 12, according to an embodiment described herein. As described above, smart wearable accessory 12 is worn by a wearer. Wearer may be a child, an elderly person, or an infirm family member related to a user. Wearer may also be a pet owned by user. User may be a parent, a caretaker, a medical supervisor, or a pet owner. User may have a mobile device 34 communicably coupled with smart wearable accessory 12 via communication network 28.

At step 62, it may be checked whether battery level of rechargeable battery 26 of smart wearable accessory 12 is sufficient. In an embodiment, when battery level of rechargeable battery 26 of smart wearable accessory 12 is not sufficient, i.e. less than a threshold power level, low battery indicator beeper is activated and control passes to step 64. In another embodiment, when battery level of rechargeable battery 26 of smart wearable accessory 12 is sufficient, i.e. exceeds threshold power level, smart wearable accessory 12 may be ready to use and control passes to step 66.

At step 64, rechargeable battery 26 of smart wearable accessory 12 may be externally charged to a level that exceeds threshold power level. Alternatively, rechargeable battery 26 of smart wearable accessory 12 may be replaced. Accordingly, smart wearable accessory 12 may be ready to use. All components of smart wearable accessory 12 are powered up and smart wearable accessory 12 may be ready to use. Control passes to step 66.

At step 66, one or more sensors 20 may be configured to generate signals corresponding to detection of one or more events in facility 32, for example home. Examples of one or more sensors 20 may include smoke sensors, motion sensors, biometric sensors, pressure sensors, audio sensors, and the like.

At step 68, GPS tracker 50 may be configured to detect location of wearer of smart wearable accessory 12 in facility 32. Location may be in form of geographical coordinates of wearer of smart wearable accessory 12 in facility 32.

At step 70, microprocessor 18 may determine severity level of one or more events based on an analysis of generated signals and location of wearer of smart wearable accessory 12 in facility 32. Severity level may be determined based on comparison of generated signals with threshold ranges. In an embodiment, combination of two or more events, sensor signals, and location of wearer of smart wearable accessory 12 in facility 32 may be used to determine a severity level of one or more events. For example, if location of wearer of smart wearable accessory 12 is in a house, and smoke sensor is showing higher signal levels, and biometric sensor signals are also above or below threshold ranges, it may imply that severity level of event is very high. On other hand, if location of wearer is outside house, and biometric sensor signals are within respective threshold ranges, but smoke sensor is showing higher signal levels, it may imply that severity level of event is medium.

At step 72, microprocessor 18 may generate one or more emergency notifications and/or alert signals based on determined severity level. Microprocessor 18 may further transmit such generated one or more emergency notifications and/or alert signals to one or more devices 42. Such one or more devices 42 may be communicably coupled to smart wearable accessory 12, based on determined severity level of one or more events. For example, in case severity level is low, emergency notifications and/or alert signals may be transmitted to only mobile device 34 of a user associated with wearer. However, in case severity level is very high, emergency notifications and/or alert signals may be transmitted to first communication device associated with sensor system 30 installed in facility 32, second communication device associated with police team 36, third communication device associated with emergency rescue team 38, and fourth communication device associated with medical team 40 in addition to mobile device 34 of a user associated with wearer of smart wearable accessory 12.

At step 74, microprocessor 18 may activate set of output devices 52 positioned on belt portion 14 based on signals received from one or more sensors 20. For example, when severity level of one or more events is very high, a voice alert, for example, "Emergency", "Your attention please", or other such voice message, retrieved from memory 46, may be played. Further, GPS tracker 50 may also display current location of wearer on display screen of mobile device 34 of user. In addition, plurality of LED lights 24 also start flashing and speaker system 22 may render audio beeps.

Accordingly, user, and personnel from police team 36, emergency rescue team 38, and medical team 40 may be able to track, locate and rescue wearer of smart wearable accessory 12 in or around facility 32 easily and save wearer's life.

So, overall, smart wearable accessory 12 is a very efficient and cost-effective rescue and tracking device that may be used to keep track of wearer rescue and facilitate rescue operation in case of emergency situations. Whenever wearer is in trouble, notifications and alert signals are immediately sent to various devices so that necessary action is taken in time to save life of wearer. Smart wearable accessory 12 is an intelligent rescue and monitoring system that provides a smart, reliable, and simple way to protect the lives of dear ones.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A smart wearable accessory for rescue and tracking, comprising:
   a belt portion to be worn by a wearer using a fastening mechanism, said belt portion having an inner circumference and an outer circumference, said fastening mechanism being mounted onto said outer circumference, said belt portion including one or more sensors generating signals corresponding to the detection of one or more events in a facility, said one or more sensors being mounted onto said outer circumference, a global positioning system (GPS) tracker detecting a location of said wearer within said facility and a microprocessor determining a severity level of said one or more events based on an analysis of said generated signals and said location of said wearer in said facility, said microprocessor being within said belt portion, said microprocessor transmitting one or more emergency notifications and/or alert signals to one or more devices, communicably coupled to said smart wearable accessory, based on said determined severity level of said one or more events and said microprocessor activating a set of output devices positioned on said belt portion based on said signals received from said one or more sensors, said one or more sensors being a smoke sensor, said set of output devices including a plurality of LED lights on said belt portion, said plurality of LED lights being evenly spaced apart on said belt portion, said plurality of LED lights extending outwardly and away from said belt portion, said plurality of LED lights being adjacent to and directly in front of said one or more sensors, said plurality of LED lights extending about said outer circumference of said belt portion, said set of output devices further including a speaker system, said speaker system emitting audio beeps, voice messages, or alarms, said speaker system being behind one of said plurality of LED lights.

2. The smart wearable accessory of claim 1, wherein said wearer is a human and wears said smart wearable accessory as a waist band, an arm band, a wrist band, or an ankle band.

3. The smart wearable accessory of claim 1, wherein said wearer is a pet associated with a user.

4. The smart wearable accessory of claim 1, wherein said one or more devices correspond to a mobile device of a user associated with said wearer, a first communication device associated with a sensor system installed in said facility, a second communication device associated with a police team, a third communication device associated with an emergency rescue team, and a fourth communication device associated with a medical team.

5. The smart wearable accessory of claim 1, wherein said smart wearable accessory is pre-registered with said one or more devices.

6. The smart wearable accessory of claim 1, further including a deactivation button being actuated to deactivate activated said set of output devices.

7. The smart wearable accessory of claim 1, wherein said one or more devices are communicatively coupled with said smart wearable accessory via a communication network.

8. The smart wearable accessory of claim 7, wherein said communication network is one of a long distance communication network or a short distance communication network.

9. The smart wearable accessory of claim 1, wherein said GPS tracker in said smart wearable accessory is synchronized with a GPS navigation application installed in a mobile device of a user associated with said wearer.

10. The smart wearable accessory of claim 1, wherein said fastening mechanism is realized by use of a buckle, a Velcro or a snap and fit mechanism.

11. The smart wearable accessory of claim 1, further including a rechargeable battery configured to supply power to said one or more sensors, said GPS tracker, said microprocessor, and said set of output devices, said battery being mounted on inner circumference.

12. The smart wearable accessory of claim 11, wherein said rechargeable battery is perpendicular to said plurality of LED lights.

13. The smart wearable accessory of claim 1, wherein said speaker system and each of said one or more sensors are wider than each of said plurality of LED lights.

14. The smart wearable accessory of claim 1 further including one or more buttons to actuate to perform various operations as power on, power off, selection of rending pattern of said audio beeps, flashing pattern of said plurality of LED lights and playout of pre-recorded of said voice messages.

15. The smart wearable accessory of claim 14 further including a memory to temporarily store various data that is retrieved by said microprocessor based on a selection provided by the wearer via said one or more buttons.

16. The smart wearable accessory of claim 1, wherein said one or more sensors further being a contact sensor, a proximity sensor, a motion sensor, biometric sensor, an audio sensor, and a pressure sensor.

17. The smart wearable accessory of claim 1, wherein said one or more events being natural calamities.

* * * * *